(12) United States Patent
McGuire et al.

(10) Patent No.: US 7,802,674 B1
(45) Date of Patent: Sep. 28, 2010

(54) BELT TENSIONING SYSTEM FOR VERTICAL CONVEYOR BELT

(75) Inventors: Patrick M. McGuire, Trophy Club, TX (US); Donald K. Wier, Mansfield, TX (US)

(73) Assignee: Transnorm System, Inc., Arlington, TX (US)

( * ) Notice: Subject to any disclaimer, the term of this patent is extended or adjusted under 35 U.S.C. 154(b) by 323 days.

(21) Appl. No.: 12/002,602

(22) Filed: Dec. 18, 2007

(51) Int. Cl.
*B65G 23/44* (2006.01)
(52) U.S. Cl. .................................... 198/816
(58) Field of Classification Search .............. 198/816
See application file for complete search history.

(56) References Cited

U.S. PATENT DOCUMENTS

| | | | | |
|---|---|---|---|---|
| 2,098,573 A * | 11/1937 | Dingle | ........................ | 198/814 |
| 2,680,545 A * | 6/1954 | Malhiot | ........................ | 221/233 |
| 3,366,220 A | 1/1968 | Hebel | | |
| 3,554,356 A * | 1/1971 | Milliken | ........................ | 198/566 |
| 3,930,323 A * | 1/1976 | Marold et al. | .................. | 37/423 |
| 4,544,061 A * | 10/1985 | Crandall | ....................... | 198/813 |
| 4,803,804 A | 2/1989 | Bryant | | |
| 5,161,665 A | 11/1992 | Cragun | | |
| 5,389,045 A | 2/1995 | Lyons | | |
| 5,895,332 A * | 4/1999 | Olson et al. | .................. | 474/113 |
| 6,189,702 B1 | 2/2001 | Bonnet | | |
| 6,273,243 B1 | 8/2001 | Loose et al. | | |
| 6,354,203 B2 * | 3/2002 | Backer et al. | ................ | 101/232 |
| 6,598,736 B2 * | 7/2003 | Ellis et al. | .................... | 198/814 |
| 6,802,414 B2 * | 10/2004 | Buhne | ........................ | 198/813 |
| 7,222,728 B2 | 5/2007 | Wier et al. | | |
| 7,424,947 B2 * | 9/2008 | Nakano | ....................... | 198/814 |

* cited by examiner

*Primary Examiner*—Joe Dillon, Jr.
(74) *Attorney, Agent, or Firm*—Kenneth F. Pearce

(57) ABSTRACT

The present invention is a system for applying tension to vertical conveyor belts. A combination of force stabilizing devices, force adjusting devices, movable plates and pivoting levers allows adjustment of the tension applied to the vertical conveyor belt. The levered tensioning allows the vertical conveyor belt to positioned in closed proximity with another conveyor or object.

12 Claims, 12 Drawing Sheets

BELT TENSIONING SYSTEM FOR VERTICAL CONVEYOR BELT

BACKGROUND OF THE INVENTION

A) Field of the Invention

Among other things, the present invention is related to belt tensioning systems for vertical conveyor belts. A combination of force stabilizing devices, force adjusting devices, movable plates and pivoting levers allows adjustment of the tension applied to the vertical conveyor belt. The belt tensioning system provides levered tensioning of the vertical conveyor belt and allows the vertical conveyor belt to be positioned in close proximity with a horizontal conveyor or other apparatus.

B) Description of the Previous Art

1) U.S. Pat. No. 5,161,665—Cragun enables a lane merger apparatus. Column 5, lines 32-65, of the '665 Patent reads, "Referring to FIGS. 5 and 7, each side transfer conveyor 18 further has a support or backing structure 76 which enables the rotating belts 31 to engage and maintain engagement of the articles 21 in the central conveyance path. The support structure 76 is disposed directly behind the portion of the belts 31 which are adjacent the central conveyance path. The support structure 76 comprises a vertical brace 85 which is coupled to a vertical bracket 79 via a bolt 97. Top and bottom horizontal roller supports 81 are connected to the brace 85 via screws. Center guides 95 are connected at the midsection of the brace 85, also via the bolt 97, and extend therefrom in opposing directions. A plurality of spacially parallel roller shafts 91 are vertically disposed between each roller support 81 and the center guide 95. As shown, rollers 77 are axially and rotatably linked to the roller shafts 91 and are separated by spacers 96, which are also axially disposed about the roller shaft 91. Preferably, the rollers 77 and spacers 96 are arranged on each shaft 91 so that they are staggered with respect to adjacent shafts 91, thereby providing a substantially flat outward surface with uniformly and densely positioned rollers 77. The rollers 77 provide backing support to the flexible belts 31 so that gripping contact between the belts 31 and articles within the conveyance path is uniformly and firmly maintained. Additionally, due to the rotation of the rollers 77 about the shafts 91, friction between the moving belts 31 and the backing support is reduced. The center guide 95 is further shown to have a generally V-shaped notch at its outwardly extended end. The belts 31 preferably have a backing rib 90 which is aligned with the center guide 95 and which cooperate to maintain alignment of the belt 31 during the transfer process." Among other things, Cragun is silent regarding utilization of reciprocating upper and lower coupling members to secure the vertical conveyor belt as it traverses about the conveyor belt's frame.

2) U.S. Pat. No. 3,366,220—Hebel enables a method and apparatus for single filing. Column 4, lines 64-67, of the '220 Patent reads, "The terminal portion of the conveyor assumes a linear pattern again and the separated rows of jars are then diverted onto single file conveyor 15 by a pair of diverting belts 10a and 10b." Among other things, Hebel teaches a pair of vertical conveyor belts. However, the '220 Patent is silent regarding the manner in which the vertical conveyor belts are attached to the conveyor frame.

3) U.S. Pat. No. 6,189,702—Bonnet enables an overhead mounted sorter for conveyors. FIG. 1 of Bonnet discloses a vertical belt assembly, and Column 7, lines 35-49, of the '702 Patent reads, "To connect the carriage 40 to the serrated timing belt 46, a clamping connector 49 is provided on the top of the carriage. As best shown in FIGS. 5a, 5b and 5c, the connector is constructed of two plates spaced apart to form a void that receives the timing belt 46. The first plate is a serrated back plate 50 configured to mate with the serrated side of the timing belt 46. The second plate is a smooth faced plate 53. To fasten the connector 49 to the timing belt 46, the two ends of the belt 46a and 46b are inserted between the two plates so that the smooth side of the belt ends faces the smooth plate 53 and the serrated side faces and engages the serrated plate 50. This arrangement is best illustrated in FIG. 5c. Inserting the belt ends 46a-b so that the teeth of the timing belt interlock with the grooves of the plate 50 fully connect the belt and carriage." Among other things, Bonnet is silent regarding utilization of reciprocating upper and lower coupling members to secure the vertical conveyor belt as it traverses about the conveyor belt's frame.

4) U.S. Pat. No. 4,803,804-Bryant enables a telescopic belt tightener for horizontal conveyor belts. Column 2, line 57 through Column 3, line 13, read, "A conventional conveyor is depicted at reference numeral 5. The conveyor includes a sturdy bed 7 for rotatably mounting rollers, such as an end roller 9, that support the belt 3. In accordance with the present invention, a telescopic belt tensioner 1 is fixedly mounted to each side of the conveyor bed 7 for adjusting the tension in the belt 3. The belt tensioners on the two sides of the bed are identical in construction and operation, so the description of one of them is sufficient. The belt tensioner comprises a quick release mechanism 10 having a housing 11 that preferably is fabricated as a square tube. To one side 13 of the housing 11 may be welded a pair of studs 15 that pass through aligned holes in the conveyor bed. The housing is firmly secured to the conveyor bed by nuts and washers 17. Near one end of the housing 11 are fastened a pair of L-shaped brackets 19 with their respective upstanding legs 21 in facing contact. Straddling the bracket legs 21 is a lever 23 that is pivotally mounted at one end thereof to the brackets 19 by a pin 25. Also pivotally mounted to the lever 23 is a second pin 27, received in which is a link 28. In the illustrated construction, the link 28 is in the form of a U-bolt having legs retained in the pin 27 by nuts 30." Among other things, Bryant is silent regarding utilization of reciprocating upper and lower coupling members to secure the vertical conveyor belt as it traverses about the conveyor belt's frame.

5) U.S. Pat. No. 6,273,243—Loose, et al. enables a device for correcting the course of a belt. Column 3, lines 22-37, reads, "Therefore, the dextrorotary moment is generated according to FIG. 4 via a reference roller RR. The reference roller RR is disposed on a lever arm pivotable in the rotary axis DA2, with the lever arm also being connected with the spring element FE. When the belt elasticity decreases, this changes the force F1' acting on the adjusting roller SR as well as the force that is exerted on the reference roller RR. If the spring element FE as well as the lever ratios are configured correctly, both torques change at the same ratio and the equilibrium of moments remains intact, that is, the adjusting roller SR does not tilt. If the belt runs off in the upward or downward direction, only the changed effective lever arm on the adjusting roller SR s1.+−.x has an effect on the equilibrium of moments and the operation remains intact, even if the belt tension is changed." Among other things, Loose is silent regarding utilization of reciprocating upper and lower coupling members to secure the vertical conveyor belt as it traverses about the conveyor belt's frame.

6) U.S. Pat. No. 5,389,045—Lyons enables a conveyor belt tensioning mechanism. Column 2, line 45 through Column 3, line 2, read, "First adjustment means 13(a) includes a threaded shaft 52 having a first end fastened to a front member 54 of first bearing housing 30 by means of nuts 56. Second end of shaft 52 extends longitudinally outwardly beyond and end flange 58 on first side rail 20. Likewise, second adjustment means 13 includes a threaded shaft 60 having a first end fastened to second bearing housing 40 by means of nuts 62, one of which is welded to bearing housing 40. A second end of shaft 60 extends longitudinally outwardly beyond an end flange 64 on second side rail 22. As shown in FIG. 4, first indicating means 15(a) has an elastically expandable and contractible body portion 70 telescoped on shaft 52 for elastic expansion and contraction movement therealong, with a first end 72 of body portion 70 contacting flange 58. Likewise, the contractible body could be rotated 180 degrees so that the opposite end 76 of body portion 70 could contact flange 58. An end nut 74 is adjustably threaded onto second end of shaft 52. Nut 74 contacts a second end 76 of body portion 70 to lock indicating means 15(a) onto side rail 20. It would be equivalent to reverse indicating means 15(a) 180 degrees, so that first end 72 contacts nut 74 and second end 76 contacts flange 58. Body portion 70 telescopically contracts indicating means 15(a) as end nut 74 is threaded onto shaft 52." Among other things, Lyons is silent regarding utilization of reciprocating upper and lower coupling members to secure the vertical conveyor belt as it traverses about the conveyor belt's frame.

7) U.S. Pat. No. 7,222,728—Wier, et al. enables an adjustable shield for a conveyor belt. Wier's FIG. 2 shows a torsion adjuster 48 that contacts a slidable housing 60 having rotable bearing 66 for gripping the pulley's drive shaft. Among other things, Wier is silent regarding utilization of reciprocating upper and lower coupling members to secure the vertical conveyor belt as it traverses about the conveyor belt's frame.

SUMMARY OF THE INVENTION

Unlike traditional tensioning mechanisms for vertical conveyor belts, the present system for applying tension to a vertical conveyor belt allows the vertical conveyor belt to be mounted within close proximity to horizontal conveyors. One of the difficulties associated with prior vertical conveyor belt mounts required that the bottom of the vertical conveyor belt be mounted several centimeters above its corresponding horizontal conveyor belt. The gap between the vertical conveyor belt and the horizontal conveyor is required to manually reach the lower bearing and adjust the tension of the vertical conveyor belt. Certain prior art vertical conveyor required specialized tools to reach and adjust the tension of the vertical conveyor belt.

The present invention eliminates various problems attributable to previous vertical conveyor belt mounting systems while meeting the long felt but unfulfilled need of providing a simple system of applying tension to the vertical conveyor belt as the vertical conveyor belt traverses about the vertical conveyor or diverter assembly without the need of raising the vertical conveyor belt several centimeters above the horizontal conveyor or the need of using specialized tools to adjust the lower bearings associated with the drive pulley or follower roll.

Among other things, Applicants' current belt tensioning eliminates the large clearance previously required to manually adjusting the lower bearings supporting vertical conveyor belt. Previous vertical belt diverters had to be mounted above the horizontal conveyor in such a manner as to provide sufficient work space between the lower edge of the diverter and the horizontal conveyor to allow the lower bearings of the diverter to be manually accessed and adjusted to increase the tension applied to the vertical conveyor belt. In other words, space and tools were required to access the diverter's lower bearings before tension applied to the vertical conveyor belt could be increased or decreased.

Applicants' novel and nonobvious tensioning system for increasing tension applied to the vertical belt can eliminate the necessity of utilizing specialized tools to adjust the tension applied by the lower bearings to the vertical conveyor belt diverter. Not only does Applicants' tensioning system for a vertical conveyor belt decrease the time to alter tension applied by the lower bearings to the vertical conveyor belt, the tensioning system also allows the lower edge of the diverter to be located very close to the upper surface of the horizontal conveyor. Among other things, placement of Applicants' vertical conveyor belt diverter in such close proximity to the upper surface of the horizontal conveyor allows Applicants' diverter to divert packages or articles of lesser height than sanctioned by previous vertical belt diverters.

An aspect of the present invention is to provide a tensioning system for a vertical conveyor belt diverter.

Still another aspect of the present invention is to provide a tensioning system for a vertical conveyor belt diverter that is simple to use.

It is another aspect of the present invention to enable methods incorporating using the tensioning system for vertical conveyor belts.

Still another aspect of the present invention is to provide a tensioning system that utilizes a lever to adjust tension applied to the vertical conveyor belts.

It is still another aspect of the present invention to provide embodiments that utilize a combination of a force stabilizing device, a force adjuster, a movable plate and a pivoting lever to adjust tension applied to the vertical conveyor belts.

Another aspect of the present invention to is to provide a tensioning system that can be easily maintained and serviced.

Still another aspect of the present invention is to provide a functioning belt tensioning system regardless of the length of the vertical conveyor belt.

It is still another aspect of the present invention to provide a belt tensioning system that if functional regardless of the height of the vertical conveyor belt.

Embodiments

An embodiment of the present invention can be described as a belt tensioning system for a vertical conveyor belt circulating about a drive pulley or a follower roll, comprising: a) an upper support plate extending between and mounted to a first belt support and a second belt support of a conveyor frame; b) a first rotable bearing slidably mounted to one of the upper support plate's plurality of apertures; c) a stationary bearing extending between and mounted to a first horizontal member and a second horizontal member of the conveyor frame; d) a lower movable plate carrying a second rotable bearing; the lower movable plate dimensioned to slide within the stationary bearing and further comprising an abutment ridge; e) the drive pulley or the follower roll connected with the first and the second rotable bearings; f) a first torsion adjuster mounted to the upper support plate and abutting a housing for the first rotable bearing; g) a second torsion adjuster mounted to the upper support plate at an end opposite the first torsion adjuster; h) a framework connected with the first and second belt supports and the first and second horizontal members; and i) a lever pivotably connected to a lever mount affixed to the framework; the lever comprising: an upper section extending above the first and the second belt supports and a lower section coacting with the abutment ridge such that application of torque to the second torsion adjuster increases pressure on the upper section of the lever such that similar force is also applied to the lower movable plate, thereby increasing tension applied to the vertical conveyor belt.

Another embodiment of the present apparatus can be described as a belt tensioning system for a vertical conveyor belt circulating about a drive pulley or a follower roll, comprising: a) an upper support plate extending between and mounted to a first belt support and a second belt support of a conveyor frame where the upper support plate further comprising: i) a first rotable bearing; and ii) a force adjuster; b) a lower movable plate carrying a second rotable bearing; c) the drive pulley or the follower roll connected with the first and the second rotable bearings; and d) a lever comprising: i) an upper section contactable by the force adjuster; and ii) a lower section coacting with the lower movable plate such that application of force to the upper section applies a similar pressure to the lower movable plate, thereby increasing tension applied to the vertical conveyor belt.

Yet another embodiment of the present invention and method can be described as a method of applying force to a pulley or a follower roll supplying tension to a vertical conveyor belt, comprising the steps of: a) mounting an upper support plate, including a plurality of apertures, to a first belt support and a second belt support parallel to the first belt support; b) securing a slidable first rotable bearing about at least one of said plurality of apertures; c) securing a lower movable plate, having a second rotable bearing mounted thereon, about a first horizontal member and a second horizontal member parallel to the first horizontal member; d) mounting a lever between the first belt support, the second belt support, the first horizontal member and the second horizontal member; e) mounting a force stabilizer device to the upper support plate such that the force stablizer can contact a housing of the first rotable bearing; f) mounting a force application device to an opposite end of the upper support plate such that the force application device can contact the upper section of the lever; g) securing the pulley or follower roll to the first rotable bearing and the second rotable bearing; h) locking the first rotable bearing for preventing the first rotable bearing from sliding; i) using the force stabilizer to apply tension to said vertical conveyor belt; and j) causing the force application device to contact the upper section of the lever such that the lower section of the lever pivots to abut the lower movable plate causing the second rotable bearing to move the pulley or the follower roll against the vertical conveyor, thereby increasing the tension applied to the vertical conveyor belt.

In still another embodiment, the present invention can be described as an assembly for applying tension to a vertical conveyor belt circulating about a pulley or a follower roll, wherein said pulley or follower roll is mounted between a slidable upper rotable bearing secured to a fixed upper support plate and a lower rotable bearing mounted to a lower movable plate, said assembly further comprising: a) the upper support plate mounted to upper horizontal members of a conveyor frame where the upper support plate further comprises: a first tension adjuster for contacting a housing for the slidable upper rotable bearing such that tension is applied to the vertical conveyor belt; and a second tension adjuster opposite the first tension adjuster; b) the lower movable plate secured about lower horizontal members of the conveyor frame; and c) a lever mounted between the upper horizontal members and the lower horizontal members.

Yet another embodiment of the present device can be described as a pivoting assembly for applying tension to a vertical conveyor belt circulating about a pulley or a follower roll; the pivoting assembly comprising: a) a lever mounted inward of and between a pair of upper horizontal members and a pair of lower horizontal members of a vertical conveyor belt frame, wherein said lever includes an upper section and a lower section for engaging a lower movable plate secured about the lower horizontal members; b) an upper plate mounted to the upper horizontal members, where the upper plate comprises: an upper rotable bearing, a first torsion adjuster and a second torsion adjuster; and c) the pulley or said follower roll secured to the upper rotable bearing and the lower rotable bearing such that application of pressure to the upper section of the lever pivots the lower section of the lever to contact the lower movable plate, thereby increasing tension to the vertical conveyor belt.

It is the novel and unique interaction of these simple elements which creates the apparatus and methods, within the ambit of the present invention. Pursuant to Title 35 of the United States Code, descriptions of preferred embodiments follow. However, it is to be understood that the best modes and preferred embodiments descriptions do not limit the scope of the present invention.

DESCRIPTION OF THE PREFERRED EMBODIMENTS

Although the disclosure hereof is detailed to enable those skilled in the art to practice the invention, the embodiments published herein merely exemplify the present invention.

In the most general sense, the present invention is system for applying tension to a vertical conveyor belt. More specifically, the current belt tensioning system includes combination of a force application device, a force stabilization device and a pivoting lever to increase tension applied to the vertical conveyor belt. Within the scope of the present invention, the vertical conveyor belt contacts a pulley or follower roll that is connected between an upper rotable bearing and a lower rotable bearing. The rotable bearings are connected with or supported by either a stationary plate or a movable plate associated with the conveyor frame supporting the vertical belt.

The combination of the coupling members, a drive pulley and follower roll and a novel and nonobvious belt tensioning system allow the endless vertical conveyor belt to traverse about the conveyor frame and divert one or more items from a first carriage path to a second carriage path. It has been unexpectedly discovered that certain embodiments of the present diverter can generate vertical belt speeds of about 180 meters per minute.

As used herein, "vertical belt" or "vertical conveyor belt" or "endless vertical conveyor belt" shall mean that the belt's article contacting surface is generally perpendicular to the horizontal.

Select embodiments of the present invention mount the diverter above a generally horizontal conveyor that carries one or more articles along a first carriage path. Generally, the diverter is mounted at a preselected angle oblique to the first carriage pathway. When an item contacts the moving endless vertical endless belt, the diverter diverts the item from the first carriage path to the second path.

Within the scope of the present invention, the current belt tensioning system allows the vertical conveyor belt of the diverter assembly to be positioned within about 6 millimeters or less of the horizontal conveyor. Such a reduced clearance between the vertical conveyor belt and the horizontal conveyor allows the present diverter assembly to divert smaller articles than could not be diverted by prior art vertical conveyors.

Figure 1:
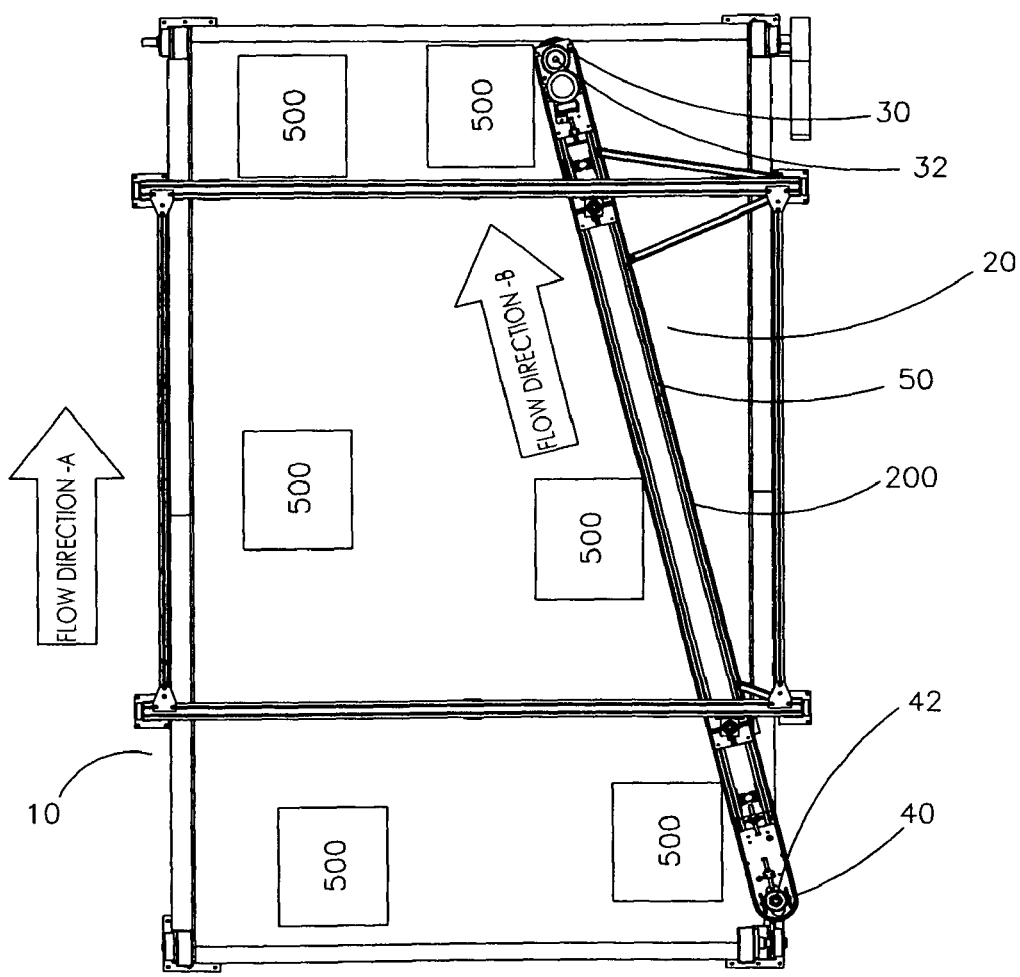
FIG. 1 is a plan view of horizontal conveyor (10) that has diverter (20) mounted above horizontal conveyor (10).

FIG. 1 is a plan view of horizontal conveyor (10) that has diverter (20) mounted above horizontal conveyor (10). Diverter (20) can be mounted above horizontal conveyor (10) in any manner acceptable in the art. In the embodiment portrayed, horizontal conveyor (10) transports a plurality of articles (500) and moves in the direction of arrow A.

As shown in the FIG. 1 embodiment, diverter (20) has drive pulley (30), follower roll (40), frame (50) and endless vertical conveyor belt (200). Endless vertical conveyor belt (200) moves in the direction of arrow B or clockwise as viewed from above diverter (20). However, those skilled in the art recognize that diverter (20) can be configured and positioned such that endless vertical conveyor belt (200) moves counterclockwise as viewed from above diverter (20). Additionally, although not shown in FIG. 1, select embodiments of the present invention can position a plurality of diverters (20) about a generally horizontal conveyor to divert one or more articles. By way of illustration, embodiments of the present invention can be utilized: to merge a plurality of articles from a wider to a narrower conveyance stream on the same conveyor; to move articles from a first conveyor to a second conveyor; or to move articles from a first conveyor to devices other than conveyors.

Drive shaft (32) extends outward from pulley (30) and is connected with a power source (not shown) for powering drive shaft (32). Drive pulley (32) engages vertical conveyor belt (200) and moves the vertical conveyor belt about frame (50) of diverter (20). As vertical conveyor belt (200) moves, belt tension causes follower roll (40) to rotate about axle (42). When engineering parameters require, a second drive pulley can be utilized instead of follower pulley (40).

Figure 2:
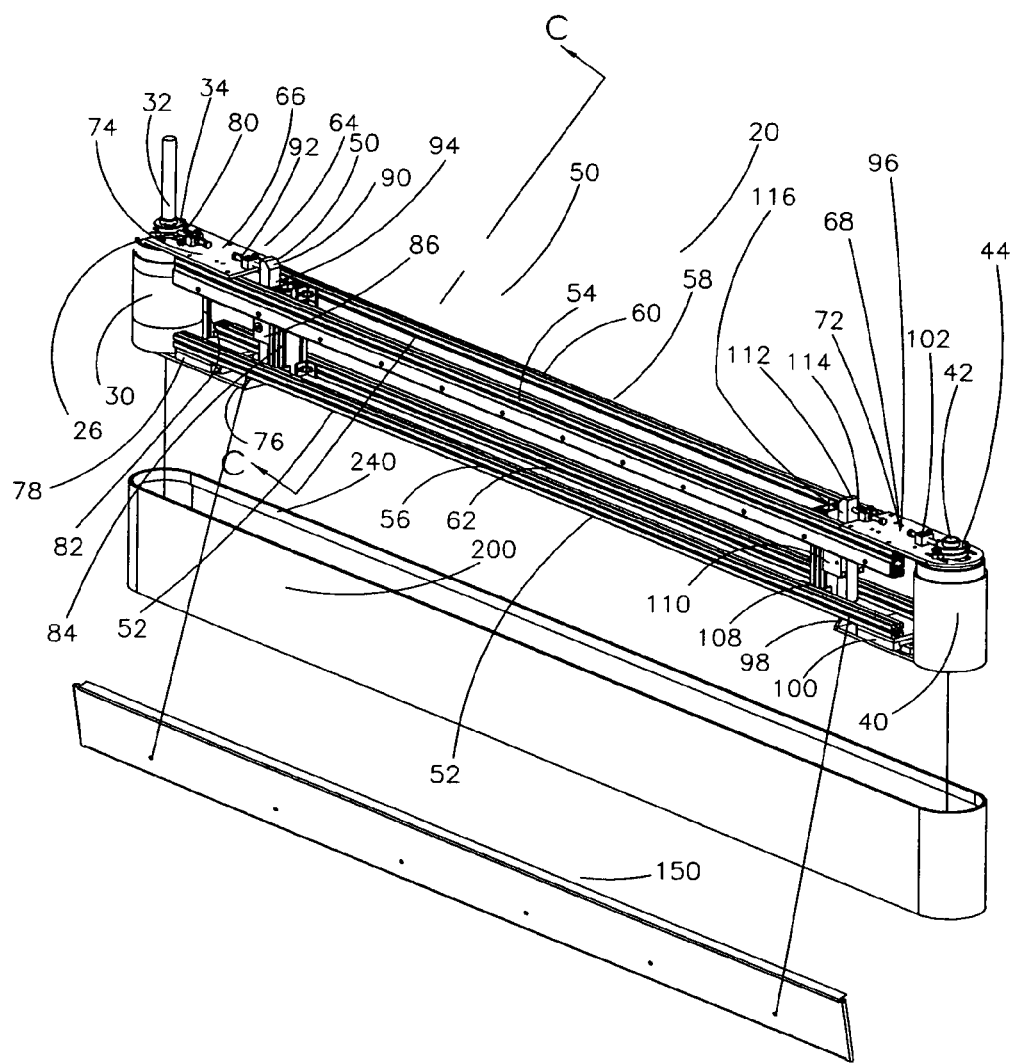
FIG. 2 is an exploded perspective of diverter (20).

FIG. 2 is a perspective of diverter (20) showing vertical conveyor belt (200) and deck (150) exploded away from frame (50) of diverter (20). Vertical conveyor belt (200) includes rider (240) (best seen in FIGS. 3 and 4). In the practice of select embodiments of the present invention, deck (150) engages part of vertical conveyor belt (200) as vertical conveyor belt (200) rotates about frame (50).

With a view still toward FIG. 2, article facing side (52) of frame (50) is provided with belt support (54) and horizontal member (56). Side (58) of frame (50) is distal from articles to be diverted and is provided with belt support (60) and horizontal member (62). First end (64) of frame (50) includes pulley mount (66) and second end (68) of frame (50) includes roll mount (72).

Upper support plate (74) of pulley mount (66) spans from belt support (54) to belt support (60). Upper support plate (74) is secured to belt supports (54 and 60) in any manner acceptable in the art. Lower movable plate (76) of pulley mount (66) spans between horizontal member (56) and horizontal member (62). In this embodiment, lower movable plate (76) slides within bearing (78) that is secured to horizontal members (56 and 62). Bearing (78) is secured to horizontal members (56 and 62) in any manner acceptable in the art.

Drive shaft (32) extends outward from upper rotable bearing (34) of pulley (30). Torsion adjuster (80) is mounted to upper support plate (74) and rides against the outer housing of rotable bearing (34). Lower movable plate (76) of pulley mount (66) carries a rotable bearing (not shown in this view). Stabilizing bar (82) extends between upper support plate (74) and lower movable plate (76) and is connected to upper support plate (74) and lower movable plate (76) in any manner acceptable in the art. Framework (84) is connected to belt supports (54 and 60) and horizontal members (56 and 62). Lever mount (86) is affixed to framework (84) by any manner acceptable in the art. Lever (90) is attached to lever mount (86) such that lever can pivot toward and away from drive pulley (30). Upper support plate (74) has torsion adjuster (92) that abuts against lever (90). The application of pressure against upper section (94) of lever (90) causes lower movable plate (76) to move the rotable bearing (not shown in this view) outward from frame (50), thereby increasing the tension applied to vertical conveyor belt (200).

With reference still toward FIG. 2, upper support plate (96) of roll mount (72) spans from belt support (54) to belt support (60). Upper support plate (96) is secured to belt supports (54 and 60) in any manner acceptable in the art. Lower movable plate (98) of roll mount (72) spans between horizontal member (56) and horizontal member (62). In this embodiment, lower movable plate (98) slides within bearing (100) that is secured to horizontal members (56 and 62). Bearing (100) is secured to horizontal members (56 and 62) in any manner acceptable in the art.

Torsion adjuster (102) is mounted to upper support plate (96) and rides against outer housing of rotable bearing (44). Lower movable plate (98) of roll mount (72) carries a rotable bearing (not shown in this view). Framework (108) is connected to belt supports (54 and 60) and horizontal members (56 and 62). Lever mount (110) is affixed to framework (108) by any manner acceptable in the art. Lever (112) is attached to lever mount (110) such that lever (112) can pivot toward and away from follower roll (40). Upper support plate (96) has torsion adjuster (114) that abuts against lever (112). The application of pressure against upper section (116) of lever (90) causes lower movable plate (98) to move the rotable bearing (not shown in this view) outward from frame (50), thereby increasing the tension applied to vertical conveyor belt (200).

Figure 3:
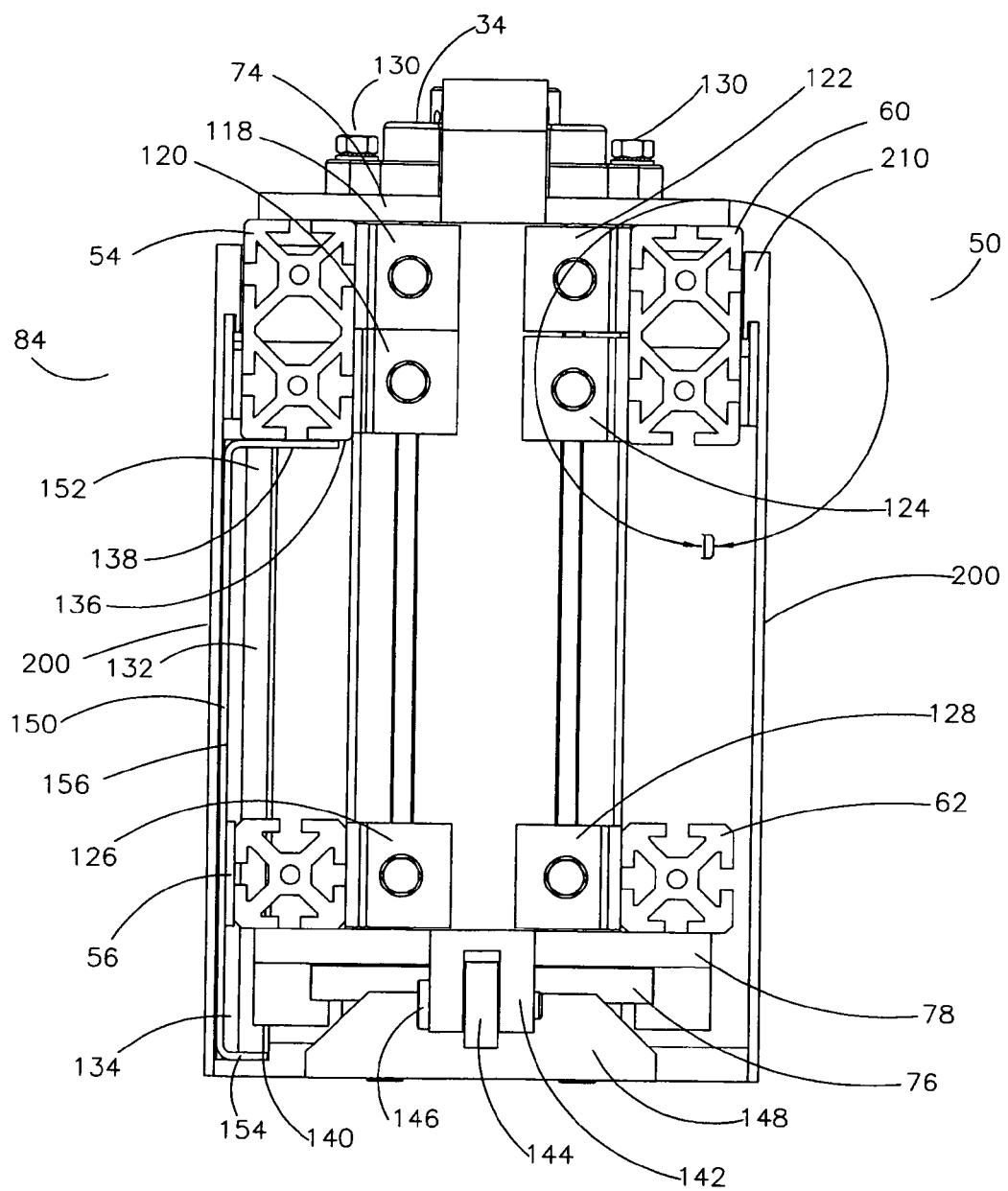
FIG. 3 is a cross section of frame (50) as taken through framework (84) along plane C-C as viewed when looking toward drive pulley (30).

For the embodiment shown in FIG. 2: framework (84) and framework (108) are like structures; lever mount (86) and lever mount (110) are like structures; lever (90) and lever (112) are like structures; upper support plate (74) and upper support plate (96) are like structures; lower movable plate (76) and lower movable plate (98) are like structures; bearing (78) and bearing (100) are like structures; and torsion adjusters (80), (92), (102) and (114) are like structures. FIG. 3 is a cross section of frame (50) as taken through framework (84)

along plane C-C as viewed when looking toward drive pulley (30). Framework (84) includes upper mounting blocks (118, 120, 122, 124), lower mounting blocks (126, 128) and vertical members (130, 132). Upper mounting blocks (118 and 120) are attached to belt support (54) that is positioned outward of framework (84). Upper mounting blocks (122 and 124) are attached to belt support (60) that is positioned outward of framework (84). Lower mounting block (126) is attached to horizontal member (56) and lower mounting block (128) attached to horizontal member (62). Horizontal members (56 and 62) are positioned outward of framework (84).

Upper support plate (74) spans between belt supports (54 and 60). Rotable bearing (34) is supported by upper support plate (74). A pair of locking bolts (130) are provided to lock rotable bearing (34) in position.

With a view still toward FIG. 3, expander (132) is situated between upper belt support (54) and lower horizontal member (56). Extension member (134) depends downwardly from lower horizontal member (56). Deck (150) includes upper bend (152), lower bend (154) and outward face (156). Upper bend (152) of deck (150) abuts lower edge (136) of upper belt support (54) and upper edge of (138) of expander (132). Lower bend (154) of deck (150) is secured about lower edge (140) of extension member (134). A portion of vertical conveyor belt (200) runs against outward face (156) of deck (150).

Bearing (78) is positioned beneath horizontal members (56 and 62). Lower movable plate (76) can slide along bearing (78). Lower end of lever (90) includes bearing holder (142) for roller bearing (144) and axle bolt (146). Vertical conveyor belt tension is increased when roller bearing (144) contacts abutment projection (148) of lower movable plate.

Figure 4:
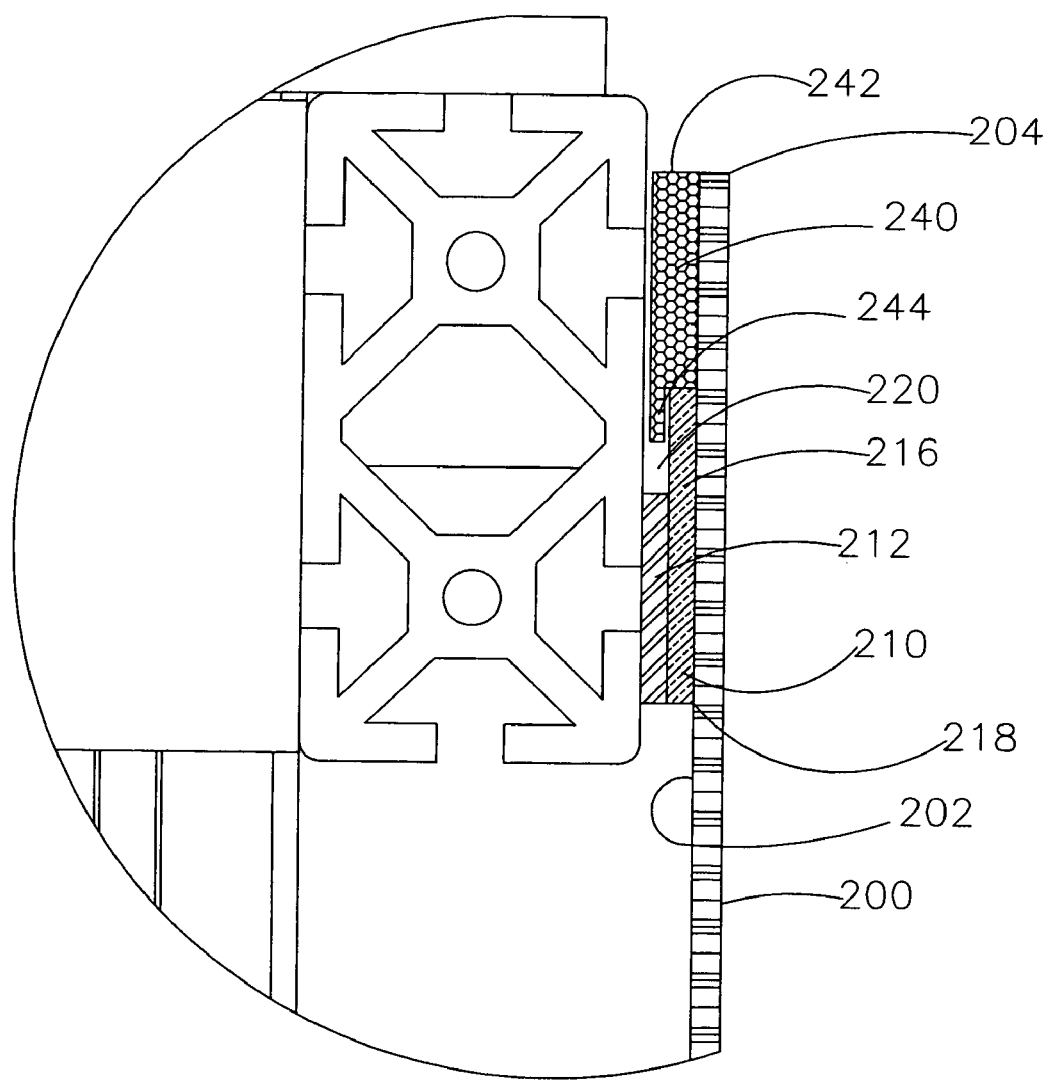
FIG. 4 is a close-up of section D of FIG. 3.

FIG. 4 is a close-up of section D of FIG. 3. Spacer (212) is affixed to belt support (60). Upright wall or rail (216) of guide (210) extends vertically upward from foot or footer (218). Foot (218) and upright wall (216) are secured to spacer (212) via adhesion or mechanical compression. In select embodiments, a series of flathead fasteners are used to secure foot (218) and spacer (212) to each or foot (218) or spacer (212) to the conveyor frame. The combination of spacer (212), foot (218) and upright wall or rail (216) create slot (220).

Rider (240) is secured to inward side (202) of vertical conveyor belt (200) via adhesion or by stitching. As shown in the FIG. 4 embodiment, upper body (242) of rider (240) is juxtaposed inward side (202) of vertical conveyor belt (200) and proximate upper edge (204) of vertical conveyor belt (200). Rider (240) is also provided with depending catch (244) that depends downwardly from upper body (242) to reciprocate with slot (220) of guide (210).

Figure 5:
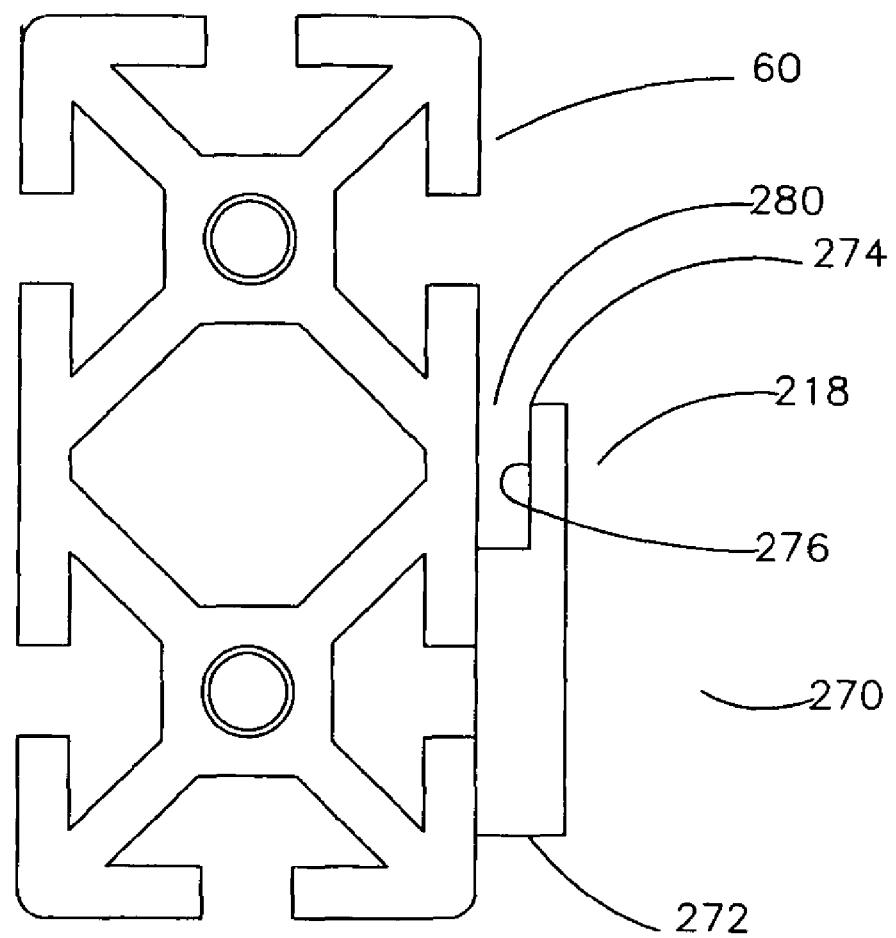
FIG. 5 is a close-up cross section of another embodiment of the guide member of the present invention.

FIG. 5 is a close-up cross section of another embodiment of the guide member of the present invention. Integrally formed guide member (270) includes foot (272) and rail (274). Slot (280) is created between inward side (276) of rail and outward side of belt support (60). Integrally formed guide member (270) is attached to outward side of belt support (60) by a series of flathead fasteners (not shown in this view).

Although the following disclosure is specifically directed toward enablement of the practice of pulley mount (66), the practice of the below previously un-enumerated structures in combination with the previously enumerated structures of the follower roll mount also enable the practice of follower roll mount (68).

Figure 6:
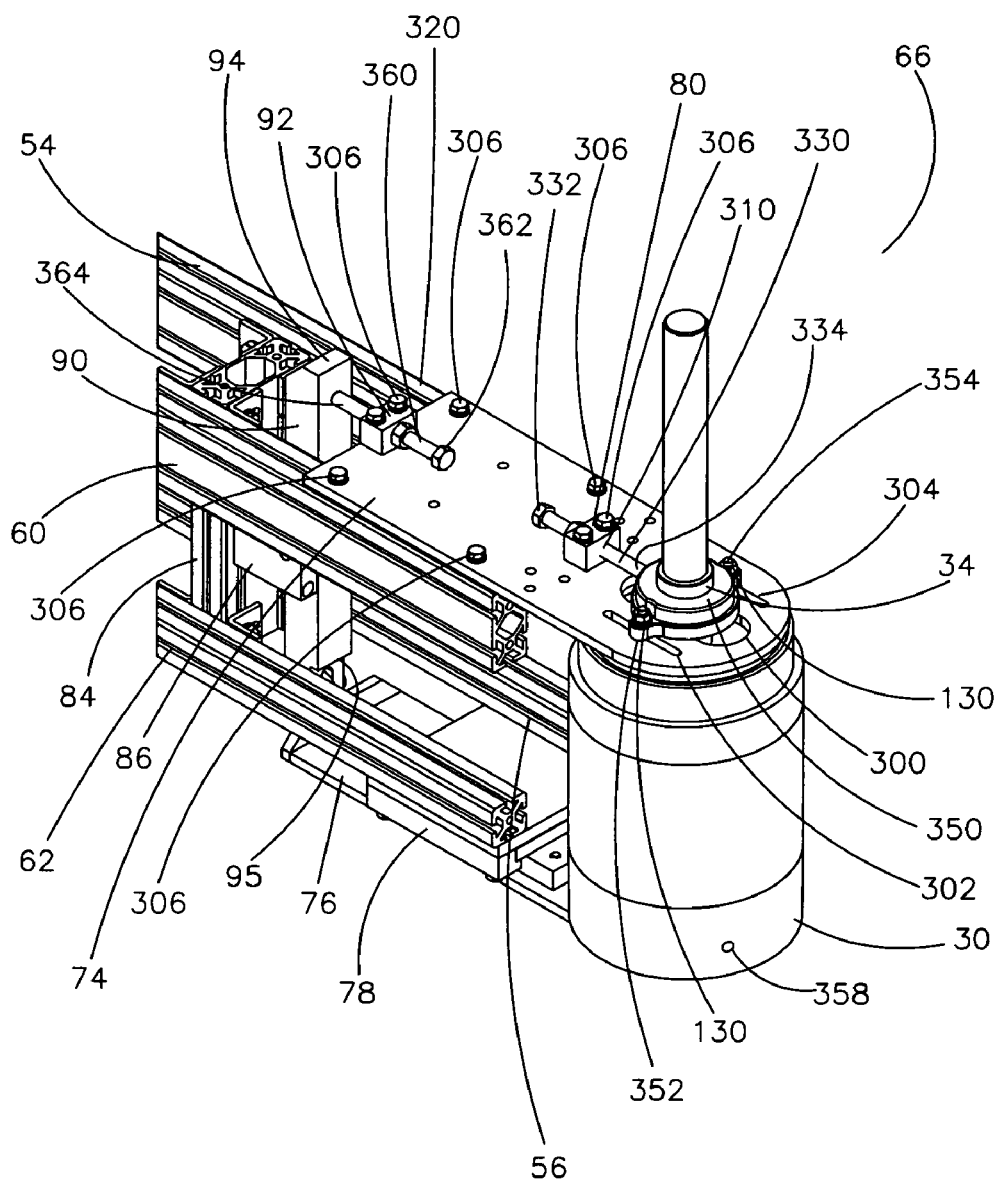
FIG. 6 is perspective of pulley mount (66) as viewed from side (58) of frame (10) that is distal from articles to be diverted.

FIG. 6 is perspective of pulley mount (66) as viewed from side (58) of frame (10) that is distal from articles to be diverted. In this particular embodiment, support plate (74) is provided with a plurality of apertures (300, 302 and 304).

Bolts (306) securely mount support plate (74) to upper horizontal support members (54 and 60). Bolts (306) are also used to mount adjuster block (310) of torsion adjuster or stabilizer (80) to support plate (74) and adjuster block (320) of torsion adjuster or force application device (92) to support plate (74). Stabilizing torsion bolt (330) is threaded through adjuster block (310). Head (332) of bolt (330) is distal from contact surface (334) that engages outer housing (350) of rotable bearing (34). Force application torsion bolt (360) is threaded through adjuster block (320). Head (362) of bolt (360) is distal from contact surface (364) that engages upper section (94) of lever (90).

Until locked in position, rotable bearing (34) can slide along the length of aperture (300). Rotable bearing housing (350) has opposing outward locking bolt engaging projections (352 and 354) having apertures (not seen in this view) for receiving locking bolts (130) that extend through apertures (302 and 304) of support plate (74). Pulley (30) can be provided with one or more apertures (358) for receiving a tool (not shown), such as a hex nut key, to assist in tightening locking bolts (130).

Framework (84) is connected to upper horizontal members (54 and 60) and lower horizontal members (56 and 62). Lever mount (86) is affixed to framework (84) by any manner acceptable in the art, such as nuts and bolts. Lower section (95) of lever (90) can contact lower movable plate (76) to cause movable plate (76) to slide within bearing (78) mounted to lower horizontal members (56 and 62). Bearing (78) can be mounted to lower horizontal members (56 and 62) by any manner acceptable in the art such as nuts and bolts.

Figure 7:
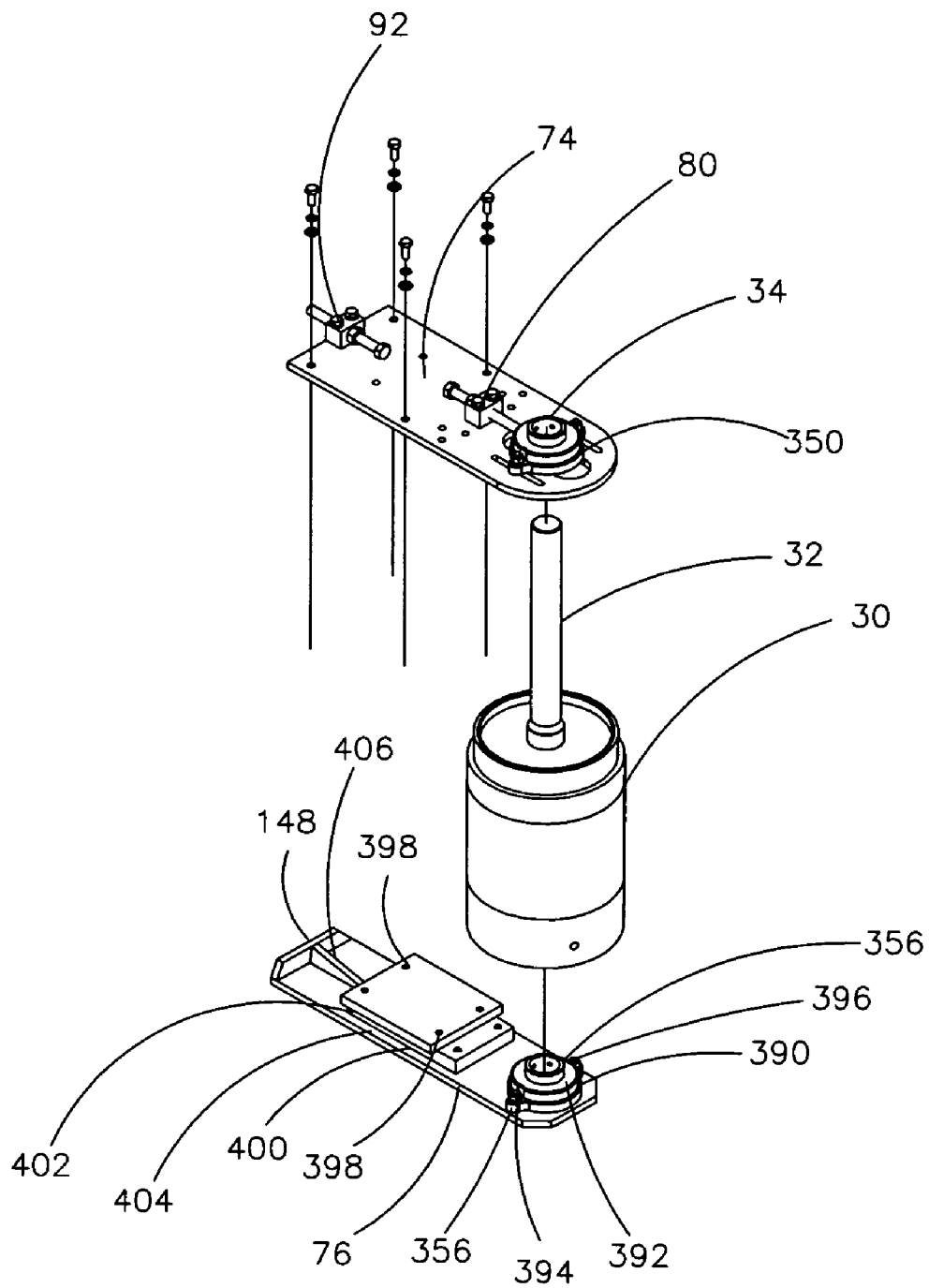
FIG. 7 is an exploded view of support plate (74), pulley (30) and movable plate (76) of the pulley mount shown in FIG. 6.

FIG. 7 is an exploded view of support plate (74), pulley (30) and movable plate (76) of the pulley mount shown in FIG. 6. As more specifically enabled in FIG. 7, associated with support plate (74) are rotable bearing (34), rotable bearing housing (350) and torsion adjusters (80 and 92). Shaft (32) of pulley (30) extends outward and upward from rotable bearing (34) and can be rotated by a motor (not shown in this view).

Rotable bearing (390) includes housing (392) provided with opposing outward locking bolt engaging projections (394 and 396) having apertures (not seen in this view) for receiving locking bolts (356) that extend through apertures (not shown in this view) of movable plate (76). Bolts (398) mount slide assembly (400) to movable plate (74). Slide assembly has spacer (402) and slide (404) for riding in bearing (78). Vertical flange (406) extends between slide assembly (400) and abutment projection (148) of movable plate (76).

Figure 8:
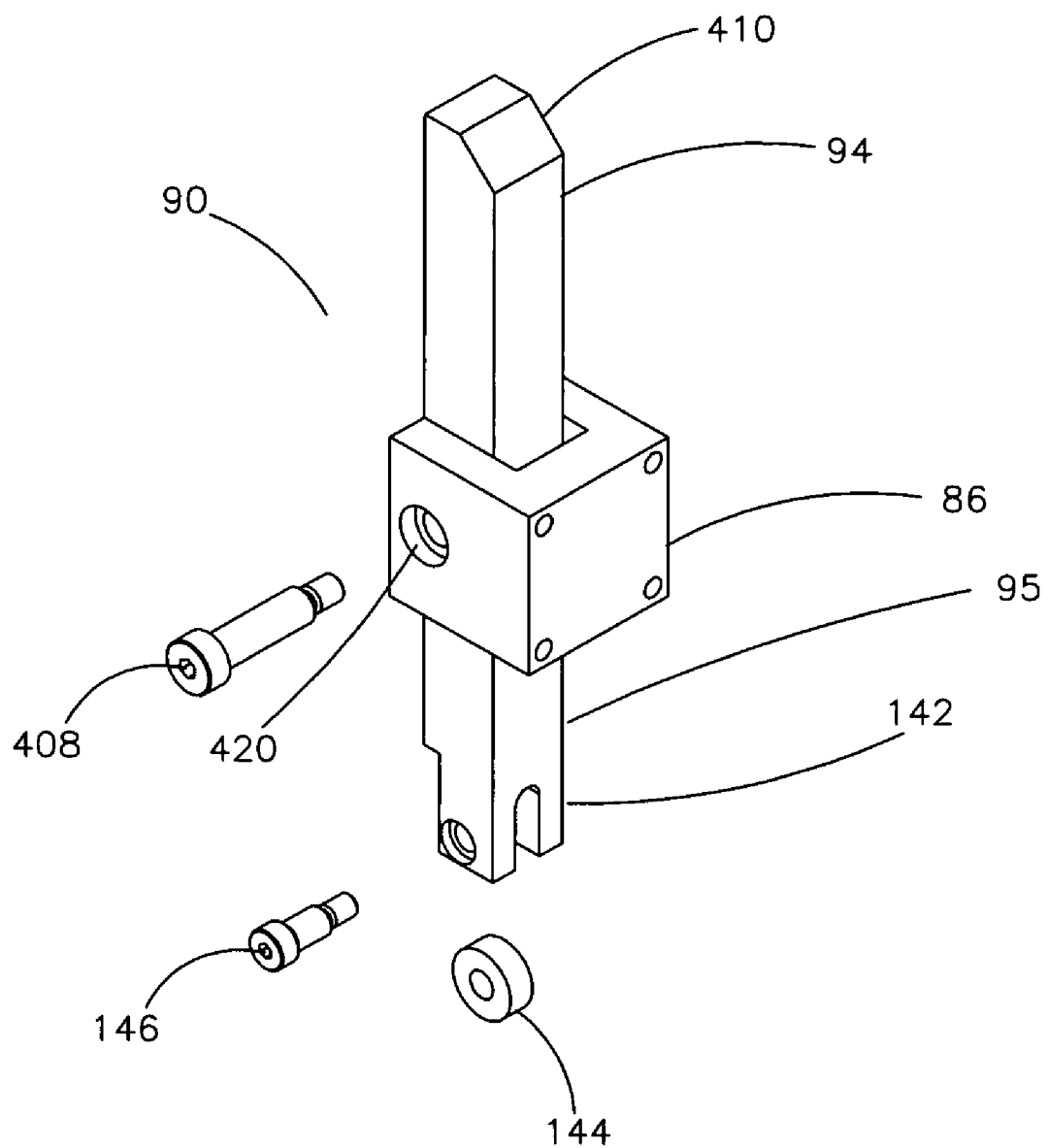
FIG. 8 is a perspective of a lever within the scope of the present invention.

FIG. 8 is a perspective of lever (90). In this particular embodiment, upper section (94) of lever (90) includes a bevel (410). Axle (408) engages aperture (420) of lever mount (86) and the lever's aperture and a locking engagement (not shown in this view) of lever mount (86) such that lever (90) can pivot about axle (408). Lower section (95) of lever has bearing holder (142) and roller bearing (144). Axle bolt (146) mounts roller bearing (144) to bearing holder (142).

After locking rotable bearing (34) engaging drive shaft (32) of pulley (30) to prevent rotable bearing (34) from moving in aperture (300), application of force by torsion adjuster (92) to upper section (94) of pivoting lever (90) causes roller bearing (144) of lower section of pivoting lever (90) to contact abutment projection of (148) of movable plate (74) carrying rotable bearing (390) engaging a lower end of pulley (30) to force pulley (30) outward from frame (50) of diverter (10) such that tension applied to the vertical conveyor belt (200) is increased.

Figure 9:
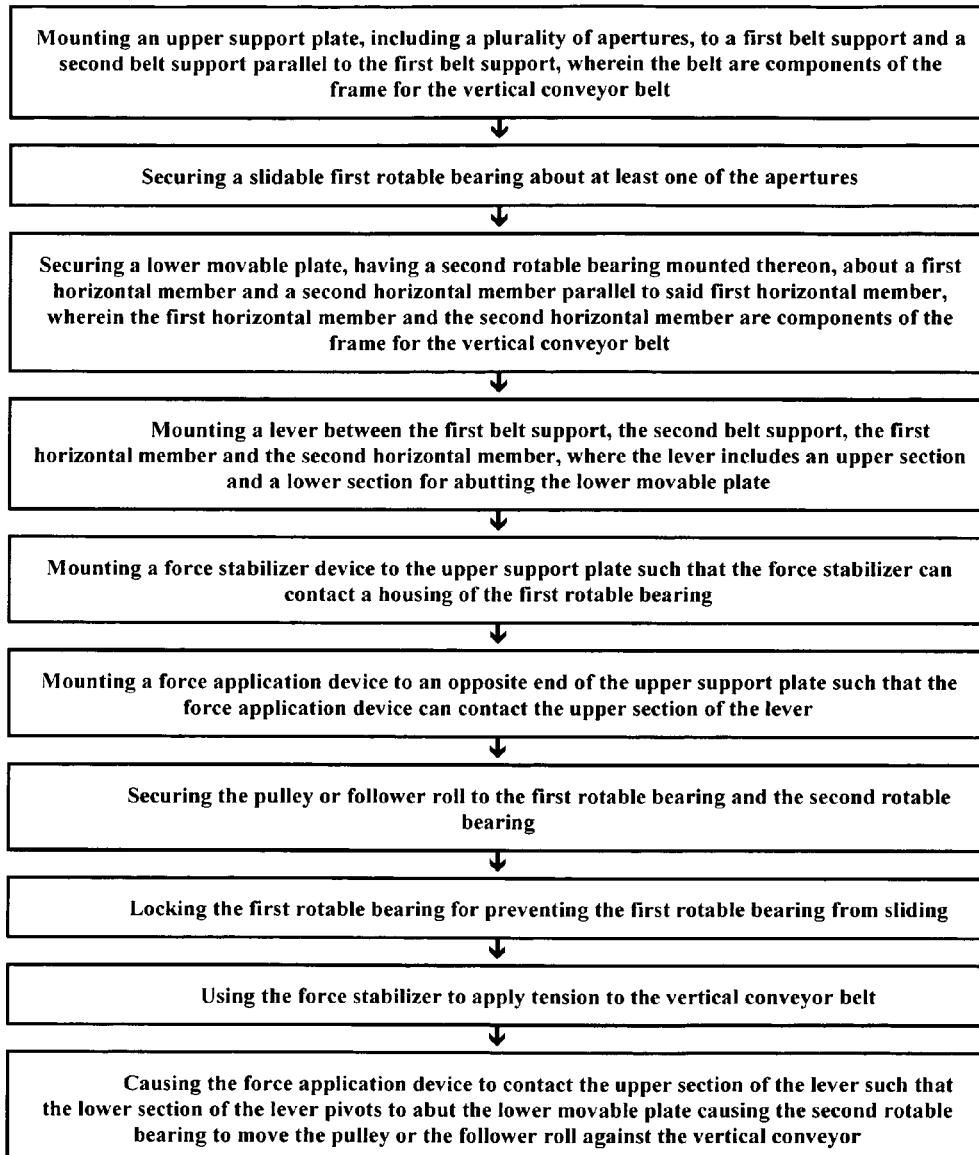
FIG. 9 is an exemplification of the steps of an embodiment of the current method.
Figure 10:
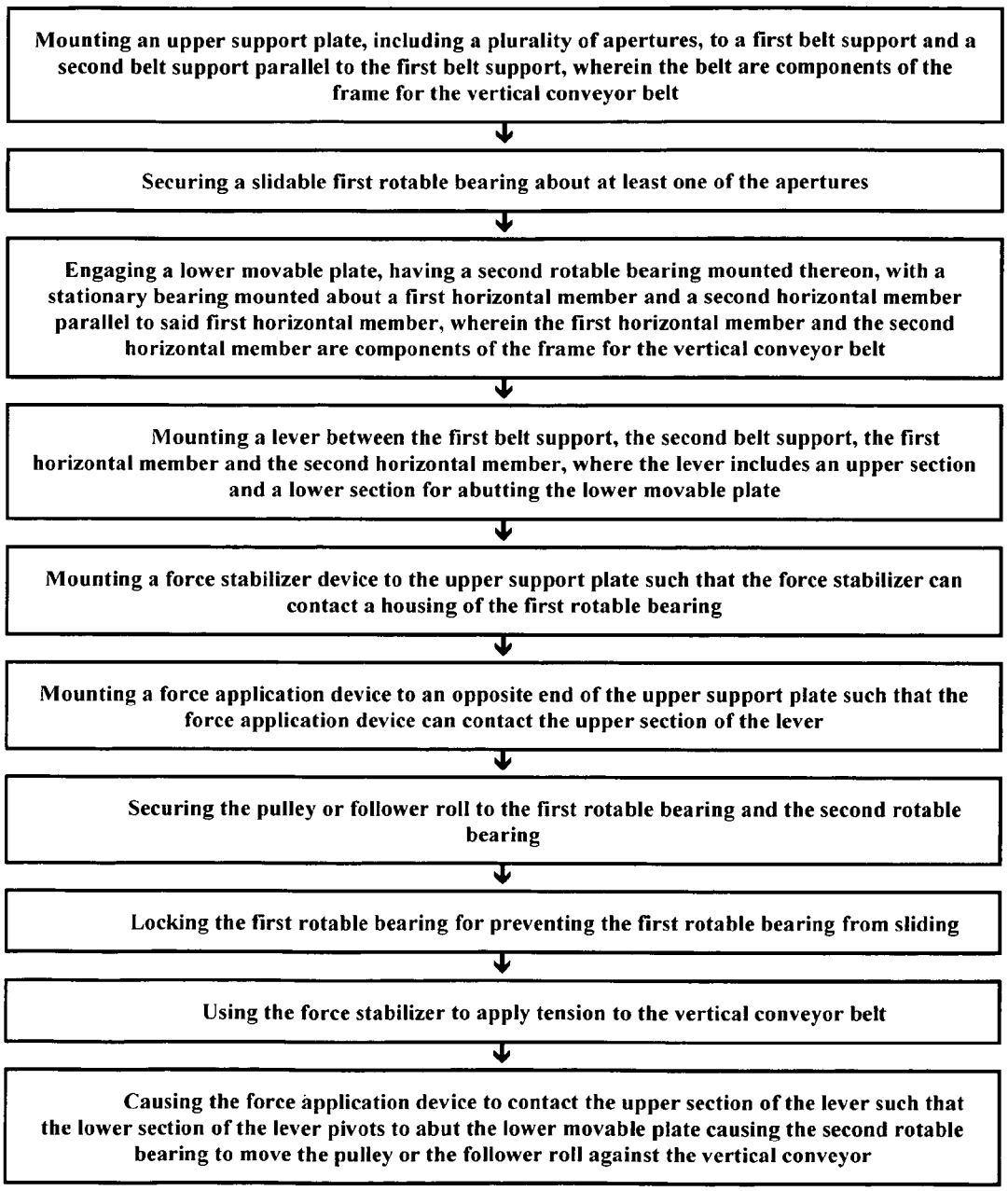
FIG. 10 is a diagrammatic representation of the steps of an embodiment of the present invention.
Figure 11:
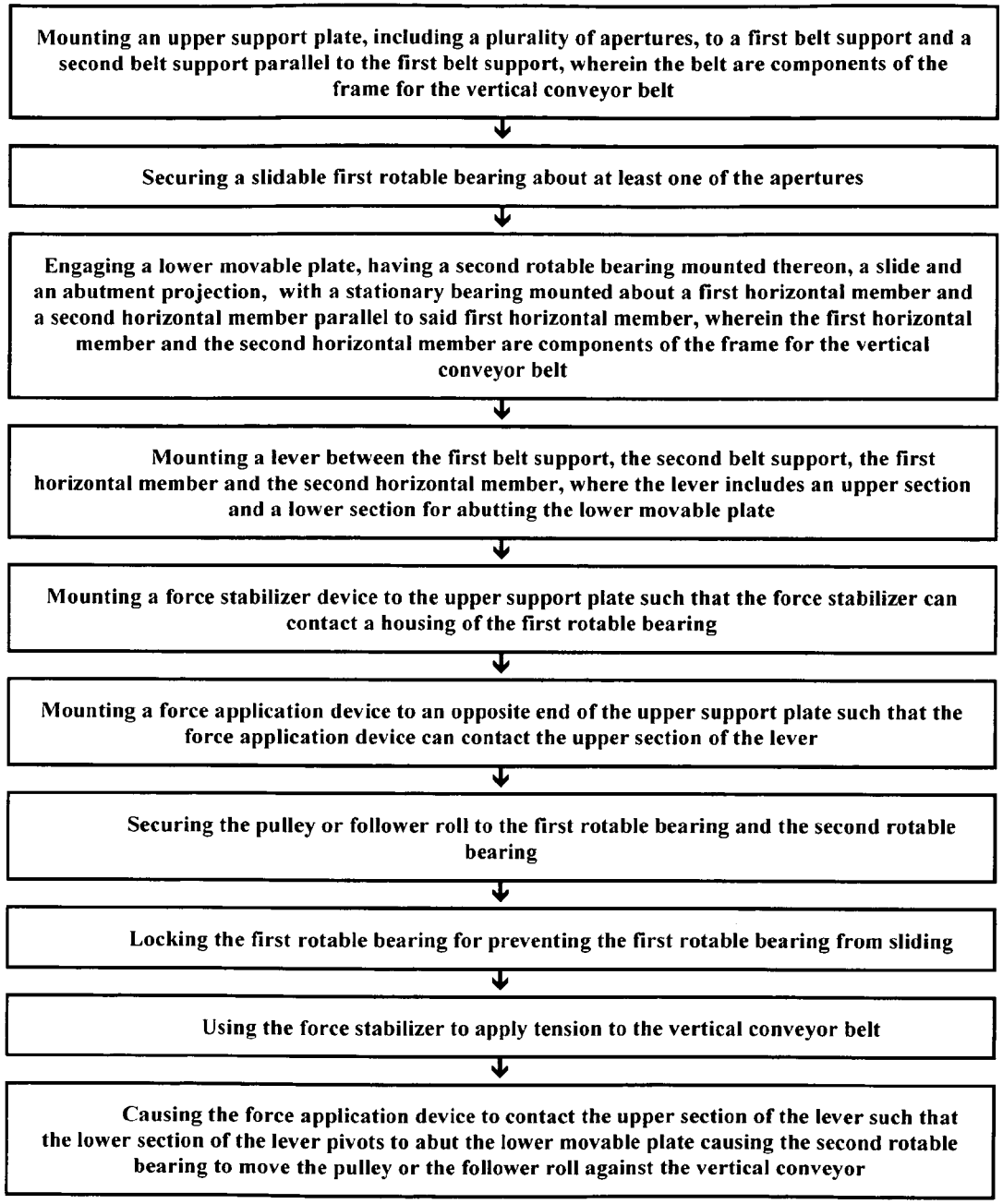
FIG. 11 is another diagrammatic representation of the steps of an embodiment of the present invention.
Figure 12:
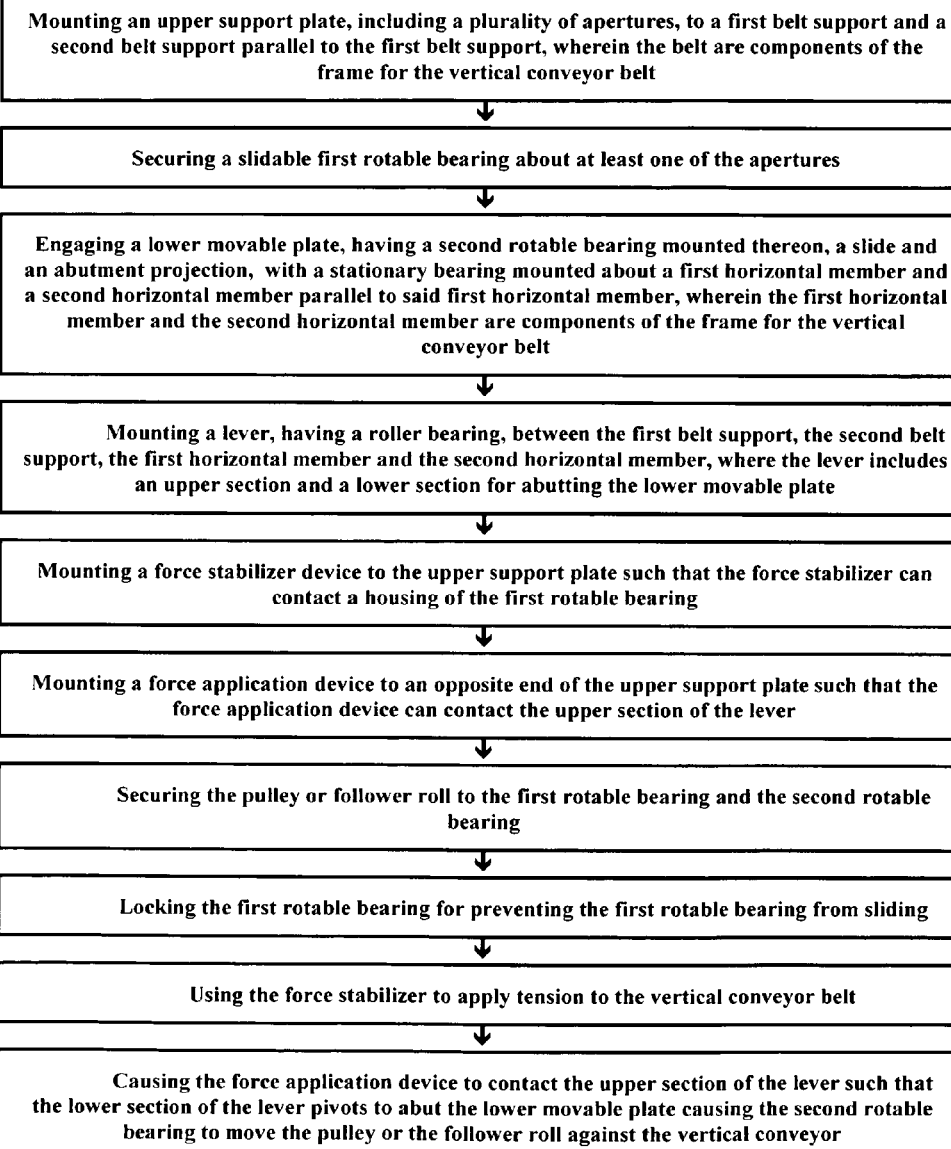
FIG. 12 is an exemplification of the steps of an embodiment of the current method.

Steps associated with the practice of the current invention and method are set forth in FIGS. 9-11. Those steps are related to the practice of making and using embodiments within the scope of the present invention.

Having disclosed the invention as required by Title 35 of the United States Code, Applicants now pray respectfully that Letters Patent be granted for their invention in accordance with the scope of the claims appended hereto.

What is claimed is:

1. A pivoting assembly for applying tension to a vertical conveyor belt circulating about a pulley or a follower roll; said pivoting assembly comprising:
   a) a lever mounted inward of and between a pair of upper horizontal members and a pair of lower horizontal members of a vertical conveyor belt frame, wherein said lever includes an upper section and a lower section for engaging a lower movable plate secured about said lower horizontal members; said lower movable plate comprising a lower rotable bearing;
   b) an upper plate mounted to said upper horizontal members, wherein said upper plate comprises:
      i) an upper rotable bearing
      ii) a first torsion adjuster; and
      iii) a second torsion adjuster; and
   c) said pulley or said follower roll secured to said upper rotable bearing and said lower rotable bearing such that application of pressure to said upper section of said lever pivots said lower section of said lever to contact said lower movable plate, thereby increasing tension to said vertical conveyor belt.

2. The invention of claim 1, wherein said lower section of said lever further comprises:
   a) a roller bearing mount;
   b) an axle; and
   c) a roller bearing.

3. The invention of claim 2, wherein said upper section of said lever further comprises a bevel.

4. The invention of claim 3, wherein said lower movable plate further comprises:
   a) a slide for engaging a stationary bearing;
   b) an abutment projection; and
   c) a flange disposed between said stationary bearing and said abutment projection.

5. A belt tensioning system for a vertical conveyor belt circulating about a drive pulley or a follower roll, comprising:
   a) an upper support plate extending between and mounted to a first belt support and a second belt support of a conveyor frame; said upper support plate further comprising a plurality of apertures therein;
   b) a first rotable bearing slidably mounted to one of said upper support plate's plurality of apertures;
   c) a stationary bearing extending between and mounted to a first horizontal member and a second horizontal member of said conveyor frame;
   d) a lower movable plate carrying a second rotable bearing; said lower movable plate dimensioned to slide within said stationary bearing and further comprising an abutment ridge;
   e) said drive pulley or said follower roll connected with said first and said second rotable bearings;
   f) a first torsion adjuster mounted to said upper support plate and abutting a housing for said first rotable bearing;
   g) a second torsion adjuster mounted to said upper support plate at an end opposite said first torsion adjuster;
   h) a framework connected with said first and second belt supports and said first and second horizontal members; and
   i) a lever pivotably connected to a lever mount affixed to said framework; said lever comprising:
      i) an upper section extending above said first and said second belt supports; and
      ii) a lower section capable of pushing said abutment ridge such that application of torque to said second torsion adjuster increases pressure on said upper section of said lever such that force is also applied to said lower movable plate, thereby increasing tension applied to said vertical conveyor belt.

6. The invention of claim 5 further comprising a locking apparatus for said first rotable bearing.

7. The invention of claim 6, wherein said lever further comprises a roller bearing for contacting said abutment ridge.

8. The invention of claim 7, wherein said lower movable plate further comprises:
   a) a slide; and
   b) a vertical flange.

9. A method of applying force to a pulley or a follower roll supplying tension to a vertical conveyor belt, comprising the steps of:
   a) mounting an upper support plate, including a plurality of apertures, to a first belt support and a second belt support parallel to said first belt support, wherein said first belt and said second belt supports are components of a frame for said vertical conveyor belt;
   b) securing a slidable first rotable bearing about at least one of said plurality of apertures;
   c) securing a lower movable plate, having a second rotable bearing mounted thereon, about a first horizontal member and a second horizontal member parallel to said first horizontal member, wherein said first horizontal member and said second horizontal member are components of said frame;
   d) mounting a lever between said first belt support, said second belt support, said first horizontal member and said second horizontal member; said lever comprising:
      i) an upper section extending above said first belt support; and said second belt support; and
      ii) a lower section for abutting said lower movable plate;
   e) mounting a force stabilizer device to said upper support plate such that said force stablizer can contact a housing of said first rotable bearing;
   f) mounting a force application device to an opposite end of said upper support plate such that said force application device can contact said upper section of said lever;
   g) securing said pulley or follower roll to said first rotable bearing and said second rotable bearing;
   h) locking said first rotable bearing for preventing said first rotable bearing from sliding;
   i) using said force stabilizer to apply tension to said vertical conveyor belt; and
   j) causing said force application device to contact said upper section of said lever such that said lower section of said lever pivots to abut said lower movable plate causing said second rotable bearing to move said pulley or said follower roll against said vertical conveyor belt, thereby increasing said tension applied to said vertical conveyor belt.

10. The method of claim 9 further comprising the step of mounting a stationary bearing between said first horizontal member and said second horizontal member for receiving said lower movable plate.

11. The method of claim 10 further comprising the step of equipping said lower moveable plate with a slide and an abutment projection.

12. The method of claim 7 further comprising the step of equipping said lower section of said lever with a roller bearing.

* * * * *

UNITED STATES PATENT AND TRADEMARK OFFICE
CERTIFICATE OF CORRECTION

PATENT NO.         : 7,802,674 B1
APPLICATION NO.    : 12/002602
DATED              : September 28, 2010
INVENTOR(S)        : Patrick M. McGuire et al.

It is certified that error appears in the above-identified patent and that said Letters Patent is hereby corrected as shown below:

Col. 14, lines 4-6, Claim 12 should read -- The method of claim 11 further comprising the step of equipping said lower section of said lever with a roller bearing. --

Signed and Sealed this

Thirtieth Day of November, 2010

David J. Kappos
*Director of the United States Patent and Trademark Office*